US005629365A

United States Patent [19]
Razavi

[11] Patent Number: 5,629,365
[45] Date of Patent: May 13, 1997

[54] UV-ABSORBING POLYMER LATEX

[75] Inventor: Homaune A. Razavi, Chesterfield, Mo.

[73] Assignee: Monsanto Company, St. Louis, Mo.

[21] Appl. No.: 360,828

[22] PCT Filed: Jun. 22, 1993

[86] PCT No.: PCT/US93/05938

§ 371 Date: Dec. 21, 1994

§ 102(e) Date: Dec. 21, 1994

[87] PCT Pub. No.: WO94/00524

PCT Pub. Date: Jan. 6, 1994

Related U.S. Application Data

[63] Continuation-in-part of Ser. No. 902,629, Jun. 23, 1992.
[51] Int. Cl.$^6$ .................................................... C08L 1/10
[52] U.S. Cl. ..................... 524/37; 524/94; 524/145; 524/236; 524/296; 524/297; 524/379; 524/381; 524/384; 524/398; 524/432
[58] Field of Search ............................ 524/555, 37, 94, 524/236, 381, 296, 297, 379, 384, 398, 432, 145

[56] References Cited

U.S. PATENT DOCUMENTS

| | | | |
|---|---|---|---|
| 3,813,255 | 5/1974 | Mannens et al. | 428/435 |
| 4,496,650 | 1/1985 | Yagihara et al. | |
| 4,983,454 | 1/1991 | Hiraki et al. | 428/335 |
| 4,985,559 | 1/1991 | Goldberg et al. | 544/34 |
| 5,084,537 | 1/1992 | Stoyan | 526/245 |

FOREIGN PATENT DOCUMENTS 0027284  4/1981  European Pat. Off. .

*Primary Examiner*—Jeffrey T. Smith
*Attorney, Agent, or Firm*—Michael J. Murphy

[57] ABSTRACT

Aqueous latices adapted to forming visible light transparent, coherent polymeric films, e.g. in laminates, as protective coatings or as adhesives, comprising colloidal particles of a UV-absorbing polymer less than 5 micrometers in diameter. Useful UV-absorbing polymer include homopolymers and copolymers of vinyl-functionalized monomer of benzotriazole or benzophenone and mixtures with plasticizer and/or coalescing agent. Plasticizer and coalescing agents are useful for providing polymer with reduced glass transition temperature to facilitate coalescence of polymer particles into coherent films. Useful additives for the latices of this invention include wetting agents, surfactants, and crosslinking agents, anti-oxidants and radical scavengers. The latices of this invention are particularly useful in providing clear, thin coatings on windows, tags, labels, flooring, tents, awnings, containers and other UV-susceptible substrates.

27 Claims, 4 Drawing Sheets

UV-ABSORBING POLYMER LATEX

This is a continuation-in-part of commonly assigned, U.S. application Ser. No. 07/902,629, filed Jun. 23, 1992.

Disclosed herein are aqueous latices of UV-absorbing polymer adapted to forming laminate coatings of visible light transparent, coherent polymeric film and methods of making and using such latices and laminates.

BACKGROUND OF THE INVENTION

Japanese Kokai 57-45169 and 58-38269 disclose solvent polymerization of copolymers containing UV-absorbing monomer units useful as coating additives. Specifically disclosed copolymers comprise up to about 22 mole percent (about 30 weight percent) benzotriazole UV-absorbing monomer units an a non-UV-absorbing comonomer such as methyl methacrylate, styrene or butyl acrylate.

U.S. Pat. No. 4,528,311 discloses optically clear UV-absorbing copolymers comprising up to 20 weight percent of 2-hydroxy-5-acrylyloxyphenyl-2H-benzotriazoles for UV-absorbing films that afford 85% absorption at 400 nanometers and 1 millimeter thickness.

U.S. Pat. No. 4,576,870 discloses coextruded laminates comprising UV-absorbing polymer coatings (10–100 microns thick) comprising up to 20 weight percent of 2-hydroxyphenylbenzotriazole monomers.

U.S. Pat. Nos. 4,785,063 and 4,892,915 disclose incorporation of 2-(2-hydroxy-5-acryloyloxyalkyl)-phenyl-2H-benzotriazoles UV-absorbing copolymerizable additives at low levels, e.g. at about 2 percent, in acrylate coatings which are cured by E-beam radiation.

U.S. Pat. No. 4,927,891 discloses acrylic coating resins with up to 20 weight percent hydrazide functionalized light stabilizers, e.g. hindered amine light stabilizers, 2-hydroxybenzophenones, 2-(2-hydroxyphenyl)-2H-benzotriazoles, aryl salicylates and oxalanilides.

EPO 0 282 294 discloses optically clear silicone polymers containing vinylsilylalkoxy arylbenzotriazole monomer units.

U.S. Pat. Nos. 3,745,010 and 3,761,272 disclose emulsion polymerized, UV-absorbing benzotriazole acrylate copolymers useful in photographic applications, e.g. to protect photographic film against UV radiation. Copolymers, e.g. of methylmethacrylate or butylacrylate and 2–70% benzotriazole-functionalized methacrylates, are useful at up to 40% by weight in UV-absorbing layers. For instance, glass coated with gelatin and emulsions of such UV-absorbing copolymers provided photographic filters having a maximum absorption at 352 nm.

U.S. Pat. Nos. 4,612,358 and 4,652,656 disclose UV-absorbing copolymers of 20–60 percent benzotriazole-functionalized acrylamides useful for protective layers for UV sensitive plastics. Bulk polymerized copolymers comprised methyl methacrylate and 20 weight percent benzotriazole monomer. Emulsion polymerized copolymers comprising methylmethacrylate and 50 weight percent benzotriazole monomer were prepared in large particle size (100 micron). Such UV-absorbing copolymers are said to be useful for providing a UV protective layer for a UV sensitive plastic.

U.S. Pat. Nos. 4,443,534 and 4,455,368 disclose UV-absorbing copolymer latex useful in UV-absorbing protective layers for photographic film, e.g. light sensitive silver halide material.

SUMMARY OF THE INVENTION

This invention provides aqueous latices adapted to forming visible light-transparent, coherent polymeric films, e.g. in laminates, as protective coatings or as adhesives. The latices comprise colloidal particles of a UV-absorbing polymer suspended in a substantially aqueous medium, wherein said particles are less than 5 micrometers in diameter. Useful UV-absorbing polymer include homopolymers and copolymers of vinyl-functionalized monomer of benzotriazole or benzophenone and mixtures with plasticizer and/or coalescing agent. Plasticizer and coalescing agents are useful for providing polymer with reduced glass transition temperature (Tg) to facilitate coalescence of polymer particles into coherent films. Useful additives for the latices of this invention include wetting agents, surfactants, and crosslinking agents, anti-oxidants and radical scavengers.

The latices of this invention are particularly useful in providing clear, thin coatings on UV-susceptible substrates; such coatings can be applied as topcoats, as intermediate layers in a laminate or as adhesive layers. The specific application of the UV-absorbing polymer coating will depend on the intended use of the substrate, e.g. as a coating to protect outdoor articles such as tents, labels, posters and signs, as a UV barrier on glass or plastic windows, display cases and containers, as an intermediate or top coat on flooring; as an adhesive to apply decals or transparent films to transparent substrates, or as a compounding additive for colorfast inks.

DETAILED DESCRIPTION OF PREFERRED EMBODIMENTS

The aqueous latices of this invention are adapted to forming visible light-transparent, coherent polymeric films, e.g. in laminates, as protective coatings or as adhesives. The latices comprise colloidal particles of a UV-absorbing polymer suspended in a substantially aqueous medium, i.e. the medium is primarily water with minor amounts of organic adjuvants which may be useful in providing enhanced coating properties or solubility to additives. The UV-absorbing polymers of this invention include homopolymers of vinyl-functionalized UV-absorbing monomer of benzotriazole or benzophenone, e.g. an acrylate or methacrylate functionalized benzotriazole or benzophenone such as 2-(2'-hydroxy-5-methacrylyloxyethylphenyl)-2H-benzotriazole, 2-(2'-hydroxy-3-tertbutyl-5-(methacrylyloxyethyl)phenyl propionate)-2H-benzotriazole and 2-hydroxy-4-acrylyl oxyethoxy benzophenone. Preferred UV-absorbing polymers useful in this invention are copolymers of at least 20 weight percent of vinyl-functionalized monomer of benzotriazole or benzophenone and up to 80 percent by weight of one or more other vinyl monomers. More preferably, the UV-absorbing copolymers of this invention comprise at least 30 weight percent vinyl-functionalized UV-absorbing monomer, even more preferably at least 40 weight percent and not more than 80 weight percent of UV-absorbing monomer, say between 45 and 75 weight percent.

Other vinyl monomers useful in the copolymers of this invention include acrylic acid and esters thereof such as ethyl acrylate, butyl acrylate, 2-ethylhexyl acrylate, hydroxyethyl acrylate, hydroxypropyl acrylate and carboxyethylacrylate; methacrylic acid and esters thereof such as methylmethacrylate, ethyl methacrylate, butyl methacrylate, 2-ethylhexyl methacrylate and decylmethacrylate; hydroxyvinyl compounds such as hydroxyethyl methacrylate, hydroxypropyl methacrylate and hydroxyethylacrylate; vinyl aromatics such as styrene; cyano compounds such as acrylonitrile and acrylamide; vinyl acids such a maleic acid, maleic anhydride or acrylic acid; vinyl esters such as vinyl acetate, vinyl formal and vinyl butyral; crosslinking monomers such as glycidyl methacrylate, allyl methacrylate, diallyl maleate and butylene dicarylate; and mixtures thereof. Preferred other vinyl monomers include predominately acrylates and methacrylates. The selection of the non-UV-absorbing comonomers will generally be made depending on application performance criteria, such as desired Tg, adhesiveness, compatibility with other materials in a laminate, toughness, flexibility, etc. A mixture of non-UV-absorbing monomers can be useful, e.g. methylmethacrylate can provide high Tg and hydroxyethyl acrylate can provide enhanced adhesion.

The use of aqueous latices for providing UV-absorbing films provides an environmental advantage, e.g. the avoidance of volatile organic solvents. Such latices can be prepared by emulsion polymerization of the monomer units using well known techniques using surfactants and modifiers such as acrylic acid, carboxyethylacrylate and hydroxyethylmethacrylate. Useful surfactants include non-ionic alkaryl polyether alcohols and anionic alkaryl polyether sulfonates. Mixtures of surfactant dispersed vinyl monomers can be polymerized by the action of a radical initiator, e.g. potassium persulfate. Those skilled in the art of emulsion polymerization can readily prepare colloidal latices of the polymers of this invention in desirable particle size diameter, e.g. less than 5 micrometers, more preferably less than 1 micrometer, even more preferably between 0.05 and 0.5 micrometers. Small particle size of colloidal polymer facilitates the preparations of desirable thin films, e.g. less than 25 micrometers, preferably on the order of 1 to 5 micrometers.

The polymers of this invention can have a Tg in the range of −50° C. to 150° C. depending on the desired application. For applications that are exposed to high temperature, preferred coatings of UV-absorbing copolymers have a Tg greater than 20° C., preferably at least 50° C. or higher. Higher Tg copolymers can be prepared by selecting appropriate comonomers, e.g. higher levels of monomers such as methylmethacrylate, styrene or acrylonitrile and lower levels of monomers such as butyl acrylate. When high Tg copolymers are applied as coatings from aqueous latices, heat treatment may be necessary to achieve sufficient coalescence of polymer particles to effect a coherent, uniform, smooth coating. Alternatively, high Tg copolymer coatings can be achieved by providing a latex of a crosslinkable polymer, e.g. a copolymer with crosslinking monomer units. Crosslinking monomer units can comprise a variety of pendant groups, e.g. vinyl, acid, hydroxyl, epoxy or isocyante groups or mixtures thereof. For instance, UV-absorbing copolymer comprising small amounts of vinyl alcohol and glycidyl methacrylate monomer units can readily self polymerize to provide a crosslinked film. Adjunct crosslinking agents can be also incorporated into the dispersed polymer or be independently dispersed in the aqueous medium. Depending on the crosslinkable pendant groups in the UV-absorbing copolymer, adjunct crosslinking agents can comprise metal driers such as ammonium zirconylcarbonate, calcium acetate, zinc oxide, drying oils such as surfactant-stabilized unsaturated fatty acids, polyepoxy or polyvinyl compounds or mixtures thereof, urea-formaldhyde compounds such as methylated urea-formaldehyde resin or melamine-formaldehyde compounds such as methylated melamine-formaldehyde resin. A stablized UV-absorbing copolymer film can be also be achieved by blending a latex of the UV-absorbing copolymer with a latex of a crosslinked network-forming resin such as an alkyd resin. Crosslinking can promote high Tg, toughness, solvent resistance. Thus, preferred latices which are more amenable to coating applications comprise suspended polymer having a Tg lower than the Tg desired for the polymer coating application. Such latices comprise copolymer having a Tg greater than 0° C., preferably greater than 20° C.

For many applications desirable UV-absorbing films can be achieved using polymers that are enhanced with plasticizer and/or coalescing agents which can reduce the Tg of the polymer to facilitate film formation at lower temperatures. Useful coalescing agents comprise volatile solvent for said polymer added in an amount sufficient to swell the polymer and thereby reduce the Tg of the polymer in the latex to less than 50° C., preferably to less than 30° C. Upon drying and film formation the volatile coalescing agent should be expelled from the polymer providing a film with a substantially increased Tg as compared to the Tg of the latex-dispersed polymer. Useful latices of this invention comprising otherwise high Tg polymer can comprise up to 20 percent by weight of a volatile solvent as a coalescing agent. Among the useful volatile solvents are fast evaporating solvents such as acetone, ethyl acetate, methyl ethyl ketone, isopropyl acetate, isopropyl ether and tetrahydrofuran; medium evaporating solvents such as isobutyl acetate, n-butyl acetate, sec-butyl acetate, sec-butyl alcohol, tert-butyl alcohol, diethyl ketone, ethyl alcohol, methyl alcohol, methyl isobutyl ketone, methyl isopropyl ketone, methyl n-propyl ketone, 2-nitropropane, n-propyl acetate, isopropyl alcohol and n-propyl alcohol; and slow evaporating solvents such as amyl acetate, tert-amyl alcohol, isobutyl alcohol, n-butyl alcohol, diethylene glycol monobutyl ether, ethylene glycol monobutyl ether, m-cresol, cyclohexanol, cyclohexanone, diacetone alcohol, diethylene glycol, diethylene glycol monobutyl ether acetate, diisobutyl ketone, dimethyl formamide, diethylene glycol monoethyl ether, dipropylene glycol monomethyl ether, dipropylene glycol monomethyl ether acetate, ethyl butyl ketone, ethyl 3-ethoxypropionate, ethylene glycol, 2 ethylhexanol, 2 ethylhexyl acetate, ethylene glycol monoethyl ether acetate, hexylene glycol, isobutyl isobutyrate, isophorone, methyl n-amyl ketone, diethylene glycol monomethyl ether, methyl isoamyl ketone, methyl isobutyl carbinol, ethylene glycol monomethyl ether, N-methyl-2-pyrrolidone, ethylene glycol monoethyl ether, propylene glycol, propylene glycol monomethyl ether, propylene glycol monomethyl ether acetate, propylene glycol mono tertiary butyl ether and triethylene glycol. Especially preferred coalescing agents are selected from the group consisting of diethylene glycol monoethyl ether, dipropylene glycol monomethyl ether, tripropylene glycol monomethyl ether, diethylene glycol monobutyl ether, ethylene glycol monobutyl ether, propylene glycol monobutyl ether and N-methyl-2-pyrrolidone.

In many cases it is advantageous to incorporate plasticizer into the polymer of this invention, e.g. to lower the temperature softening range of polymers to facilitate coalescence at preferably lower temperatures. Plasticizer can also impart other desirable properties to films made from the polymers having a high level of UV-absorbing monomer. Properties imparted by plasticizer include flexibility, toughness, flame retardance, low temperature flexibility and improved adhesion. The type and amount of plasticizer can be selected by those skilled in the acrylic polymer compounding art, regardless of whether a polymer of this invention is applied as a soft adhesive film, a tough thermoplastic film or a crosslinked thermosetting film. Plasticizer can be added to the polymer during emulsion polymerization. Plasticizer can also be incorporated by intimately mixing dispersed plasticizer with dispersed polymer. Useful plasticizer can include alkyl adipate esters such as dioctyl adipate, alkyl aryl adipate esters such as benzyl octyl adipate, benzoate esters such as diethylene glycol dibenzoate, alkyl phthalate esters such as di-2-ethylhexyl phthalate and mixed alkyl phthalate esters such as heptyl nonyl undecyl phthalate, aryl phthalate esters such as diphenyl phthalate, alkyl aryl phthalate esters such as butyl benzyl phthalate, alkyl citrate esters such as triethyl citrate and aryl phosphate esters such as triphenyl phosphate. Preferred plasticizers for acrylic polymers of this invention include alkyl aryl phosphate esters such as 2-ethylhexyl diphenyl phosphate and isodecyl diphenyl phosphate which provide desired clarity, low temperature flexibility and fire retardance. When adhesive polymers are desired a plasticizer such as butyl benzyl phthalate is useful. In many cases it may be useful to incorporate both coalescing agent and plasticizer into the latex-dispersed polymer of this invention.

The latices of this invention can be enhanced by a variety of other common coating additives, e.g. thickening agents, wetting agents, anti-oxidants such as hindered phenols, radical scavengers such as hindered amines, slip and mar agents such as silicones, biocides, fire retardants and even pigments or dyes.

The latices of this invention typically comprise less than 1 percent by weight of a water soluble thickening agent including natural gums such as alginates, cellulosics such as methylcellulose, carboxymethylcellulose and hydroxypropyl methylcellulose, polyacrylic acids and salts thereof, and water soluble polyuretane thickeners such as non-ionic polyethylene oxide urethane block copolymers; a variety of useful thickening agents is available from Rohm and Haas Company. More typically the amount of thickening agent is determined by routine experimentation to provide the latex with a viscosity at 25° C. greater than 40 centipoises, preferably greater than 100 centipoises, more preferably greater than 200 centipoises or higher, e.g. greater than 300 centipoises. Such latex viscosity can be readily determined using common apparatus such as Brookfield viscometer using a No. 1 spindle rotating in the latex at 5 rpm.

The ability of a latex to effectively coat a substrate depends in large degree on the relative values of surface tension of the latex and the substrate surface. In the case of polymer substrates, surface tension varies by polymer species and with temperature, e.g. surface tension typically decreases with increasing temperature. For example, the surface tension at 25° C. is about 45 dynes/cm$^2$ for polyethylene terephthalate, about 43 for polycarbonate, about 43 for styrene-acrylonitrile copolymer (33 mole % acrylonitrile), about 42 for polyvinyl chloride, about 38 for polyvinyl butyral, about 35 for branched polyethylene, about 30 for polypropylene and about 24 for polytetrafluoroethylene. Reference is made to the "Polymer Handbook", Third Edition, edited J. Brandrup & E. H. Immergut, published by John Wiley & Sons, Inc. 1989, pages VI/411–434 for a more detailed tabulation of surface tension for polymers.

Polymer latex prepared with a minimal amount of surfactant to maintain a colloidal suspension of polymer may have a surface tension in the range of 45 to 50 dynes/cm$^2$. The surface tension of polymer latices of this invention can be modified to more nearly coincide with the surface tension of a substrate to be coated by addition of up to about 10 percent by weight of water soluble wetting agent which can be volatile, e.g. lower aliphatic alcohols, or non-volatile, e.g. non-ionic surfactants or anionic surfactants. Useful lower aliphatic alcohols include ethanol, n-propanol, isopropanol, n-butanol, isobutanol, n-pentanol, n-hexanol and cyclohexanol. Preferred alcohol wetting agents are the $C_3$ and $C_4$ alkyl alcohol, e.g. n-propanol or n-butanol. Among the wide variety of useful commercial nonionic surfactants are the alkaryl polyether alcohols such as octylphenol (ethylene oxide)n alcohols, where n=1.70. available as the Triton X-series of non-ionic surfactants available from Union Carbide Corporation. Among the wide variety of useful commercial anionic surfactants are the alkaryl polyether sulfonates, sulfosuccinates, alkyl naphthalene sulfonates and alkyl polyoxy carboxylates. Thus, in one aspect of this invention, a preferred latex has sufficient wetting agent to provide a surface tension of less than 43 dynes/cm$^2$, more preferably less than 41 dynes/cm$^2$.

A preferred aspect of this invention provides latex of UV-absorbing copolymers comprising sufficient wetting, thickening and coalescing agents to provide non-sagging wet films of latex on a vertical surface of glass, polymer coatings or molded plastic, e.g. polyethylene, polycarbonate, polyamide, polyethylene terephthalate, polyvinylchloride, ABS, polystyrene or polymethylmethacrylate. Such latices preferably provide dry, coherent films of UV-absorbing copolymer of a substantially uniform thickness less than 5 micrometers.

Laminates of UV-Absorbing Polymeric Films

The latices of this invention are useful for providing thin films, e.g. as a topcoat or an intermediate coating, to provide long term stabilization against adverse effects of UV light. For instance, exposure to UV light can cause white colored substrates to yellow, and brightly colored substrates to fade and transparent substrates to become cloudy. The latices of UV-absorbing polymer are useful for providing UV-protective coatings on visually informative substrates such as tags, displays, labels, decals and transparencies bearing words or images; on flooring products such as vinyl and acrylate-coated tile and sheet flooring; on outdoor textiles such as tents, awnings, sails; on outdoor signage such as posters, advertisements and highway signs; on polymeric articles such as plastic furniture, plastic glazing, hoses, vinyl siding and roofing materials; on polymeric packaging materials such as bags, bottles and films; and as an adhesive.

The latices can also be applied to transparent substrates, such as glass, crystalline or plastic windowpanes or clear plastic films, to prevent the transmission of UV light that may be adverse to the film or windowpane e.g. in the case of plastic materials such as polycarbonate or acrylic glazing, or adverse to UV-sensitive materials enclosed or protected thereby such as archival documents and artworks, draperies, furniture, flooring and carpets. Other transparent substrates include light source materials such as diffusers and fluorescent lamp tubes, where a coating according to this invention can diminish UV-light emitted by the light source.

Thus, one aspect of this invention provides laminates where a UV-sensitive substrate, e.g. a window pane, clear film, printed film, molded article, etc., is coated with an adherent, coherent, UV-resistant vinyl polymeric film comprising:

(i) 20 to 100 percent by weight UV-absorbing monomer units of vinyl-functionalized benzotriazole or vinyl-functionalized benzophenone and 0–80 weight percent of at least one other vinyl monomer, and (ii) one or more additives selected from the group consisting of plasticizer, crosslinker, nonionic surfactant wetting agent, anionic surfactant wetting agent and thickening agent. In some cases the UV-resistant polymeric film is a tough thermoplastic film capable of providing other protective topcoat qualities in addition to UV-absorption. In other cases the UV-resistant polymeric film is provided as an inner layer covered with a UV-stable and durable topcoat. In still other cases the UV-resistant polymer is provided as an adhesive to secure UV-sensitive material to a transparent surface. In the case of packaging materials a coating of UV-absorbing polymer can be effective in protecting both the packaging materials as well as the contents against discoloration and quality or aesthetic degradation.

In certain cases, e.g. labels, decals, etc., it may be desirable to provide an adhesive layer on one side of the laminate, depending on the application, so as to take advantage of the UV-absorbing layer. For instance, such an adhesive layer can be on the opposite side of the substrate from said UV-resistant vinyl polymeric film. In other case, the adhesive layer can be on the UV-resistant vinyl polymeric film. In still other cases, the UV-resistant vinyl polymeric film, itself, can be adhesive. The UV-resistant coatings of this invention are useful for protecting visually informative, UV-sensitive substrates, which can be transparent or opaque.

The UV-absorbing polymer of this invention can be advantageously applied in thin coatings, e.g. less than 25 micrometers or thinner. Preferred coatings will be less than 10 micrometers, more preferably less than 5 micrometers. In certain applications, e.g. when high levels of UV-absorbing monomer is used in a copolymer, effective coatings can be on the order of 1–2 micrometers in thickness. Preferred coatings will comprise 40–80 percent of UV-absorbing monomer units, have a Tg greater than 20° C. Preferred UV-absorbing copolymer coatings are sufficiently pervious to visible light that at least 70 percent of the visible light at 400 nanometers is transmitted. The amount of UV-absorbing co-monomer and thickness of the coating are selected to reduce the transmission of UV light (between 300 and 330 nanometers) through the coating to less than 20 percent of the incident light at those wavelengths.

In certain applications, e.g. where the copolymer is coated onto visible light-pervious substrates such as windowpanes, bottles and fluorescent lamp tubes, the UV-absorbing copolymer will preferably have a Tg of at least 50° C., more preferably at least 60° C. The copolymer coating thickness, e.g. less than 10 micrometers, and amount of UV-absorbing monomer are selected so that the transmission of UV light through the coating is less then 10 percent of the incident light having a wavelength between 300 and 360 nanometers, greater than 90 percent of the incident light at wavelengths of 400 nanometers.

Other Applications

The latices of this invention are also useful for compounding dispersed UV-absorbing polymer into UV-sensitive materials such as polymer resins and inks. In the case of polymer resins, the UV-absorbing polymer of this invention can be incorporated as a UV-stabilizing additive into polymer by conventional methods, e.g. extruder blending or by mixing with an other emulsion polymerized polymer latex. Acrylate polymer resins are especially amenable to UV-stabilization with a UV-absorbing polymers of this invention providing non-blooming, long term resistance. The latices of this invention provide a convenient source of dispersed polymer for compounding into ink formulations to provide colorfast ink, e.g. by compounding dyes or pigment into a polymer dispersion of this invention. In another aspect of this invention the dispersions of UV-absorbing polymer can be used to provide "sun screen" cosmetic compositions by compounding UV-absorbing polymer in a skin lotion base.

The invention is now described with reference to the following examples which are for purposes of illustration only and are not intended to imply any limitation on the scope of the invention. Materials used in these examples are identified using the following nomenclature:

UV-I: 2-(2'-hydroxy-5-methacrylyloxyethyl-phenyl)-2H-benzotriazole from Noramco, Inc. as Norbloc 7966.

UV-II: 2-hydroxy-4-acrylyloxyethoxy benzophenone from American Cyanamide as Cyasorb UV-2098.

UV-III: 2-(2'-hydroxy-3-tertbutyl-5-(methacrylyloxyethyl)phenylpropionate)-2H-benzotriazole.

BA: butylacrylate,

BMA: butylmethacrylate

MMA: methylmethacrylate

S: styrene

AA: acrylic acid

EA: ethylacrylate

EB: Ebecryl 170 acidic acrylate from Radcure

CEA: carboxyethylacrylate

HEMA: hydroxyethylmethacrylate

2EHA: 2-ethylhexylacrylate

NMP: N-methy-2-pyrrolidone

Surfactant-1: Alipal EP-120 from Rhone-Poulenc

Surfactant-2: Triton X-405 from Union Carbide

Plasticizer: Santicizer 160 alkyl aryl phosphate ester plasticizer from Monsanto Company.

PAA: a non-crosslinked polyacrylic acid thickening agent, Acrysol ASE-75 from Rohm & Haas Company.

PAA-XL: crosslinked polyacrylic acid thickening agent, Acrysol ASE-60 from Rohm & Haas.

LX: 1.5% aqueous solution of Katon LX biocide from Rohm & Haas Company.

Sanduvor 3051 HALS: a hindered amine light stabilizer from Sandoz chemicals.

Tinuvin 123: bis-(1-octyloxy-2,2,6,6-tetramethyl-4-piperidinyl)sebacate, hindered aminoether light stabilizer from Ciba-Geigy.

Tinuvin 292 HALS: bis(1,2,2,6,6-pentamethyl-4-piperidinyl) sebacate, sterically hindered tertiary amine light stabilizer from Ciba-Geigy.

Irganox 1010 anti-oxidant and light stabilizer: tetrakis[methylene(3,5-di-tert-butyl-4-hydroxyhydrocinnamate)]methane, a symmetrical molecule with four sterically hindered phenolic hydroxy groups from Ciba-Geigy.

Irganox 245 anti-oxidant: triethyleneglycol bis[3-(3'-tert-butyl-4'-hydroxy-5'-methylphenyl)propionate], a sterically hindered phenolic anti-oxidant from Ciba-Geigy.

Beetle 60: a methylated urea formaldehyde solution, 86% resin in isopropanol, from American Cyanamid Company, Beetle 65: a methylated urea formaldehyde resin from American Cyanamid Company, Resimene 717: a methylated melamine formaldehyde solution, 84% resin of a trimethoxymethyl melamine crosslinker in n-butyl alcohol from Monsanto Company.

Resimene 745: a methylated melamine formaldehyde solution, 84% liquid hexamethoxymethyl melamine in n-butyl alcohol from Monsanto Company.

Resimene 7550: a methylated melamine formaldehyde solution, an aqueous solution of 84% dimethoxymethyl melamine from Monsanto Company.

In the following examples polymers can be designated by the starting monomeric components using the above abbreviations followed by a weight ratio in parenthesis. A polymer may be designated either by reference to the principle monomeric components, e.g. UV-I:MMA (50:50), or by reference to all of the monomeric components, e.g. UV-I:MMA:CEA:HEMA (50:50:1:2).

EXAMPLE 1

This example illustrates the preparation of aqueous latices of UV-absorbing copolymers of this invention, i.e. copolymers of 2-(2'-hydroxy-5-methacrylyloxyethyl-phenyl)-2H-benzotriazole (UV-I).

A 50 ml flask equipped with an overhead stirrer, condenser and a syringe septum was charged with 3g of UV-I in 4 ml of deaired distilled water, 3 g of MMA, 3 g of BA, 0.1 g of AA, 0.5 g of Surfactant-1 and 0.5 g of Surfactant-2. The flask was purged with nitrogen, then the mixture was heated to reflux and emulsified. The emulsified mixture was cooled to 88° C. and charged with 0.07 g of potassium persulfate and 0.04 g of sodium bicarbonate in 4.5 ml of deaired distilled water. The mixture was stirred for 90 minutes then cooled to room temperature. The resulting latex of a copolymer of 2-(2'-hydroxy-5-methacrylyloxyethyl-phenyl)-2H-benzotriazole: butyl acrylate: methyl methacrylate: acrylic acid, i.e. UV-I:BA:MMA:AA (30:30:30:1), was filtered through a 5 micrometer filter and preserved by adding 0.05 ml of LX biocide solution.

EXAMPLES 2-8

The procedure of Example 1 was essentially repeated to prepare UV-absorbing copolymers of the benzotriazole UV-absorbing monomer UV-I in the component weight ratios indicated in the following Table 1.

EXAMPLE 9

This example illustrates the preparation of an aqueous latex of a UV-absorbing copolymer according to this invention comprising 2-hydroxy-4-acrylyloxyethoxy benzophenone (UV-II).

A 100 ml flask equipped with an overhead stirrer, condenser and a syringe septum was charged with 5 g of UV-II in 31 ml of deaired distilled water, 1.1 g of S-1, 0.5 g of S-2 and 0.1 g of sodium bicarbonate. The mixture was purged with nitrogen and rapidly stirred for at least 15 minutes to provide an emulsion; while stirring under a nitrogen atmosphere the emulsion was charged with 5 g of BMA, 0.1 g of CEA and 0.2 g of HEMA, heated to 90° C. and charged with 0.1 g of potassium persulfate in 1.7 ml of deaired distilled water. After an internal temperature rise had peaked, the stirring rate was slowed for an additional 15 minutes of stirring; the emulsion was then charged with an additional 0.03 g of potassium persulfate in 1 ml of deaired distilled water, stirred for about 30 minutes, then cooled to room temperature. The resulting latex of a copolymer of 2-hydroxy-4-acrylyloxyethoxy benzo- phenone:butyl methacrylate (1:1), designated as UV-II:BMA, was filtered through a 5 micrometer filter and preserved by adding 0.4 ml of LX biocide solution.

EXAMPLES 10-23

The procedure of Example 9 was essentially repeated to produce UV-absorbing copolymers of the benzophenone UV-absorbing monomer UV-II (Examples 10-16) and UV-absorbing copolymers of the benzotriazole UV-absorbing monomer UV-I (Examples 17-23) in the component weight ratios indicated in the following Table 2.

TABLE 1

| Example | Polymer Components | Component Weight Ratio) | Tg |
|---|---|---|---|
| 1 | UV-I:BA:MMA:AA | (30:30:30:1) | 51° C. |
| 2 | UV-I:BA:S | (1:1:1) | 51 |
| 3 | UV-I:BA:MMA:AA | (30:17:43:1) | — |
| 4 | UV-I:BA:MMA:AA:CEA | (50:20:20:1:1) | 76 |
| 5 | UV-I:BA:MMA:AA | (28:17:7:1) | 64 |
| 6 | UV-I:BA:CEA | (40:40:3) | — |
| 7 | UV-I:BA:EB:CEA:HEMA | (40:40:2:2:3) | 48 |
| 8 | UV-I:BA:MMA:AA:CEA:HEMA | (50:34:7:2:2:3) | — |

TABLE 2

| Example | Polymer Components | Component Weight Ratio) | Tg |
|---|---|---|---|
| 9 | UV-II:BMA:CEA:HEMA | (50:50:1:2) | — |
| 10 | UV-II:BMA:CEA:HEMA | (75:25:1:2) | 41° C. |
| 11 | UV-II:BMA:CEA:HEMA | (30:70:1:2) | — |
| 12 | UV-II:BMA:CEA:HEMA | (20:80:1:2) | — |
| 13 | UV-II:BMA:CEA:HEMA | (10:90:1:2) | — |
| 14 | UV-II:BMA:CEA:HEMA | (3:97:1:2) | — |
| 15 | UV-II:BMA:MMA:CEA:HEMA | (80:21:45:3:5) | 23 |
| 16 | UV-II:EA:S:CEA:HEMA | (80:40:20:2:3) | 40 |
| 17 | UV-I:BMA:CEA:HEMA | (75:25:1:2) | — |
| 18 | UV-I:BMA:CEA:HEMA | (50:50:1:2) | — |
| 19 | UV-I:BMA:CEA:HEMA | (30:70:1:2) | — |
| 20 | UV-I:BMA:CEA:HEMA | (20:80:1:2) | — |
| 21 | UV-I:BMA:CEA:HEMA | (10:90:1:2) | — |
| 22 | UV-I:BMA:CEA:HEMA | (3:97:1:2) | — |
| 23 | UV-I:BA:CEA:HEMA | (70:38:1:2) | — |

EXAMPLE 24

The procedure of example 9 was essentially repeated to prepare an aqueous latex of a UV-absorbing copolymer of 2-(2'-hydroxy-3-tert-butyl-5-(methacrylyloxyethyl) phenylpropionate)-2H-benzotriazole (UV-III). An emulsion of 8 g of UV-III in 15 ml of deaired distilled water, 4.4 g of MMA, 2.2 g of BA, 0.15 g of CEA, 0.3 g of HEMA, 0.9 g of Surfactant-1, 0.9 g of Surfactant-2 and 0.06 g of sodium bicarbonate was charged three times with 0.04 g of potassium persulfate in 0.6 ml of deaired distilled water. The copolymer designated UV-III:MMA:BA:CEA:HEMA (53:28:16:1:2), had a Tg of 42° C.

EXAMPLES 25-26

The procedure of example 9 was essentially repeated to prepare an aqueous latex of a UV-absorbing homopolymers of UV-I and UV-II with minor amounts of CEA and HEMA, e.g. the components of the homopolymer of UV-I:CEA:HEMA, Tg 92° C., and UV-II:CEA:HEMA, Tg 55° C. were in the weight ratio 100:1:2.

EXAMPLE 27

Figure 1:
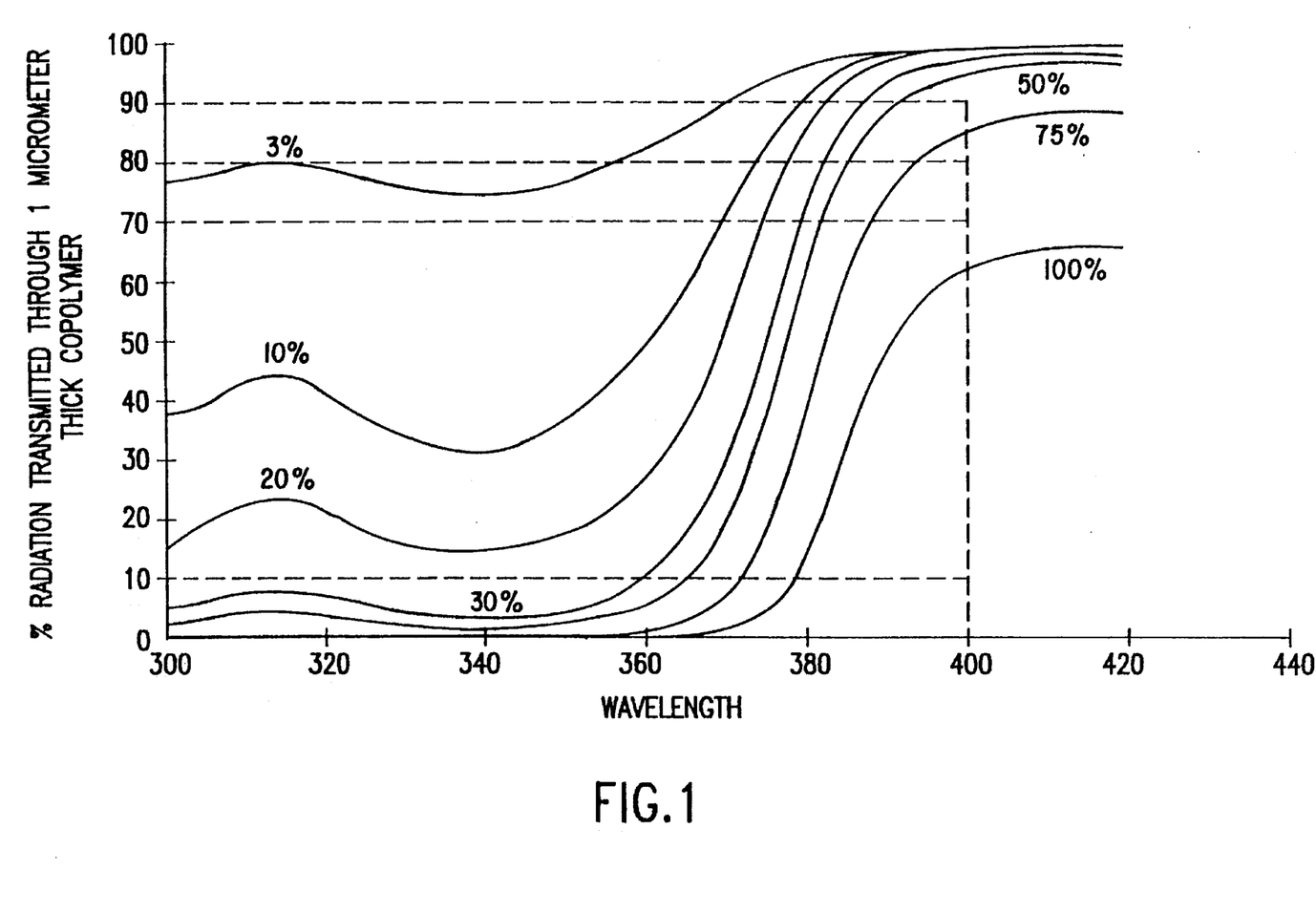
FIGS. 1 and 2 illustrate the efficacy of films of copolymers of this invention in abating transmission of UV radiation.
Figure 2:
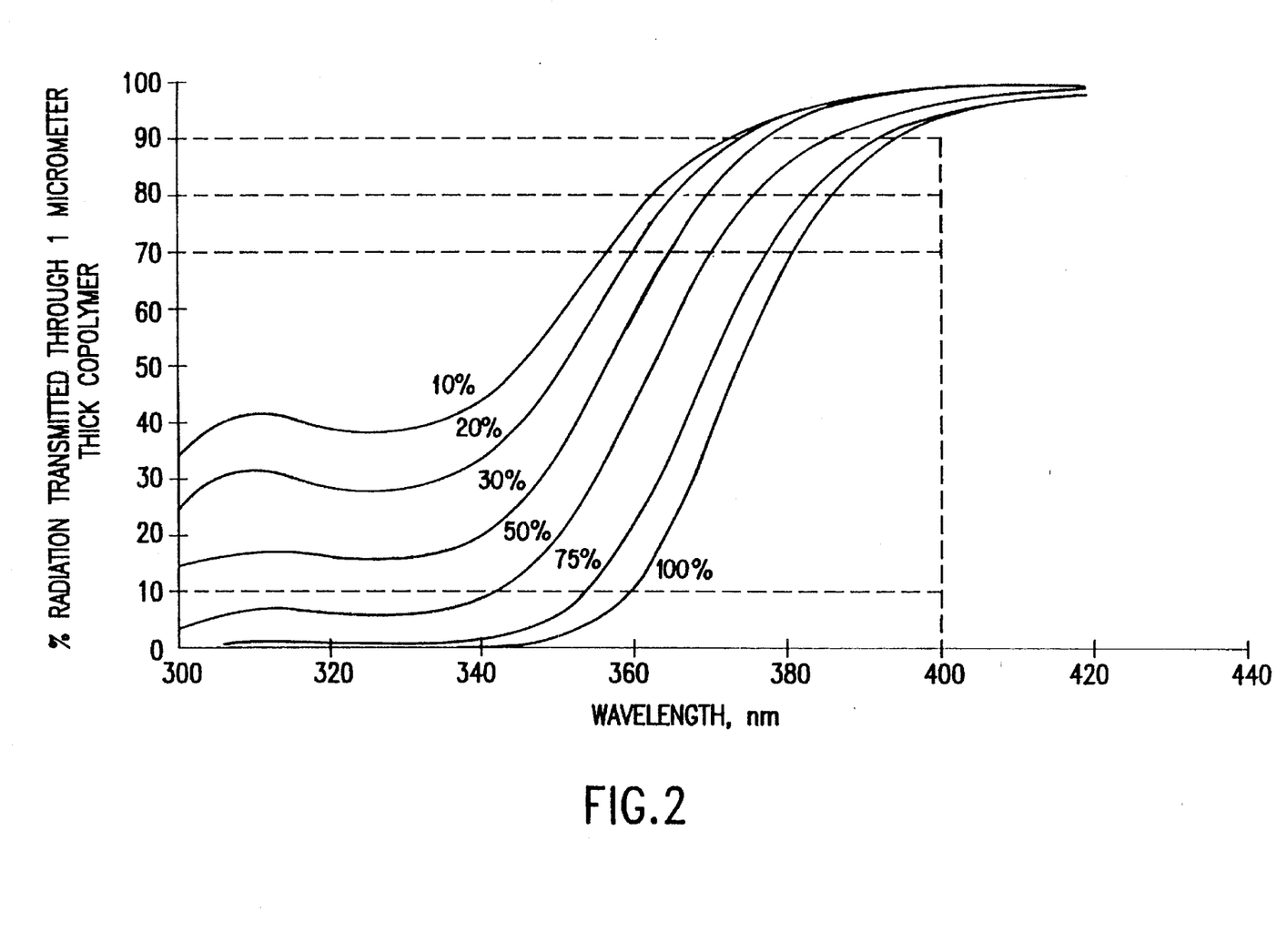

This example illustrates the efficacy of films of the copolymers of this invention in absorbing UV radiation. Latices of the copolymers of UV-I:BMA of Examples 17–22 and the homopolymer of UV-I of Example 25 were coated onto glass plates and dried providing laminates which were subjected to UV light transmission analysis. FIG. 1 shows the effect of 1 micrometer thick coatings on abating the transmission of UV radiation. For instance, a film comprising 3 weight percent of UV-absorbing monomer transmits about 75% of the radiation in the range of 300–350 nanometers. At least 30% UV-absorbing monomer is required to reduce UV transmission to below 10% in the range of 300–350 nanometers. Latices of the copolymers of UV-II:BMA of Examples 9–13 and the homopolymer of UV-II of Example 26 were coated onto glass plates and dried providing laminates which were subjected to UV light transmission analysis; FIG. 2 shows the effect of 1 micrometer thick coatings on abating the transmission of UV radiation.

EXAMPLE 28

Figure 3A:
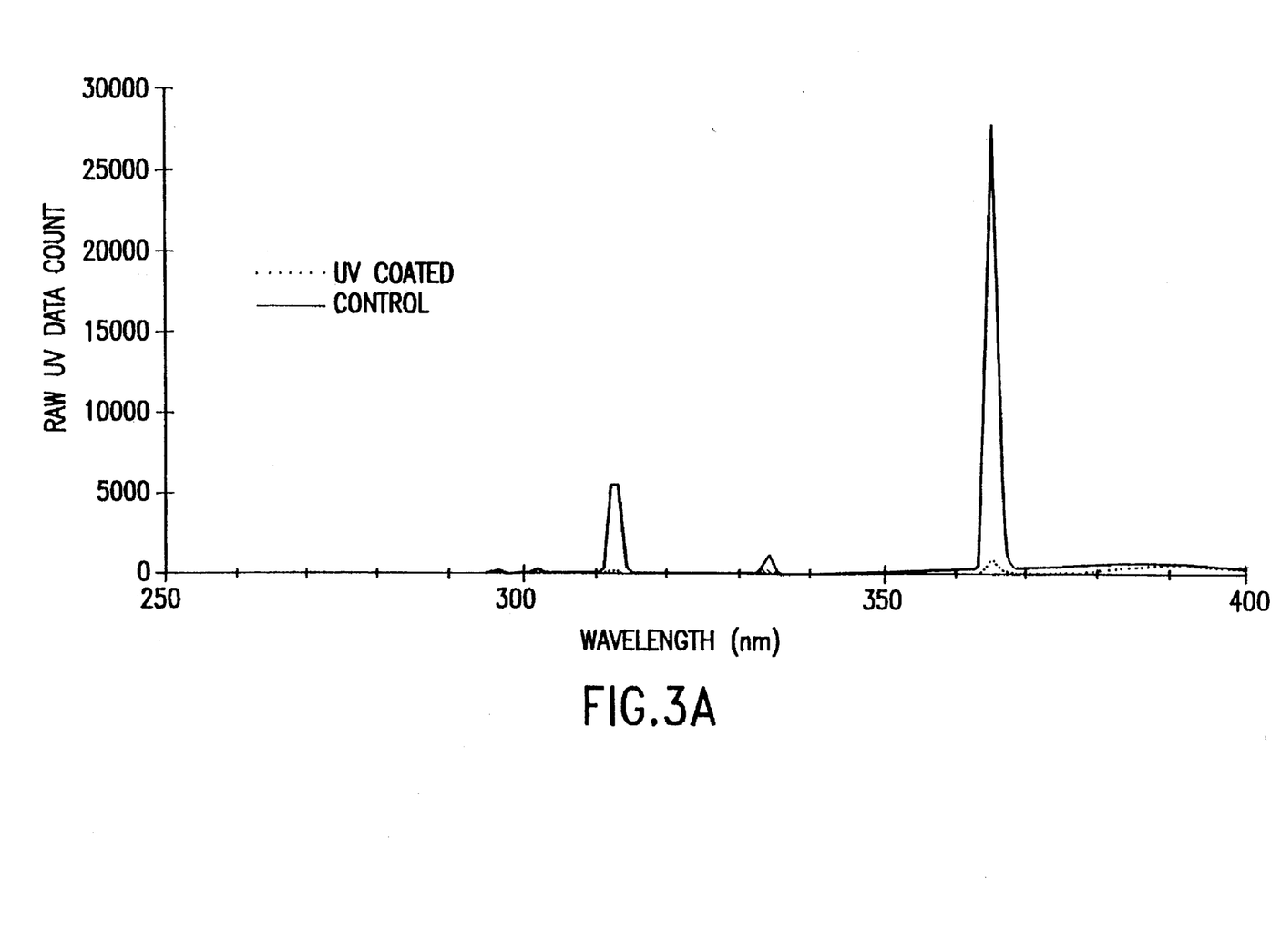
FIGS. 3A and 3B illustrate the efficacy of a copolymer of this invention in abating transmission of UV radiation from fluorescent lamps.
Figure 3B:
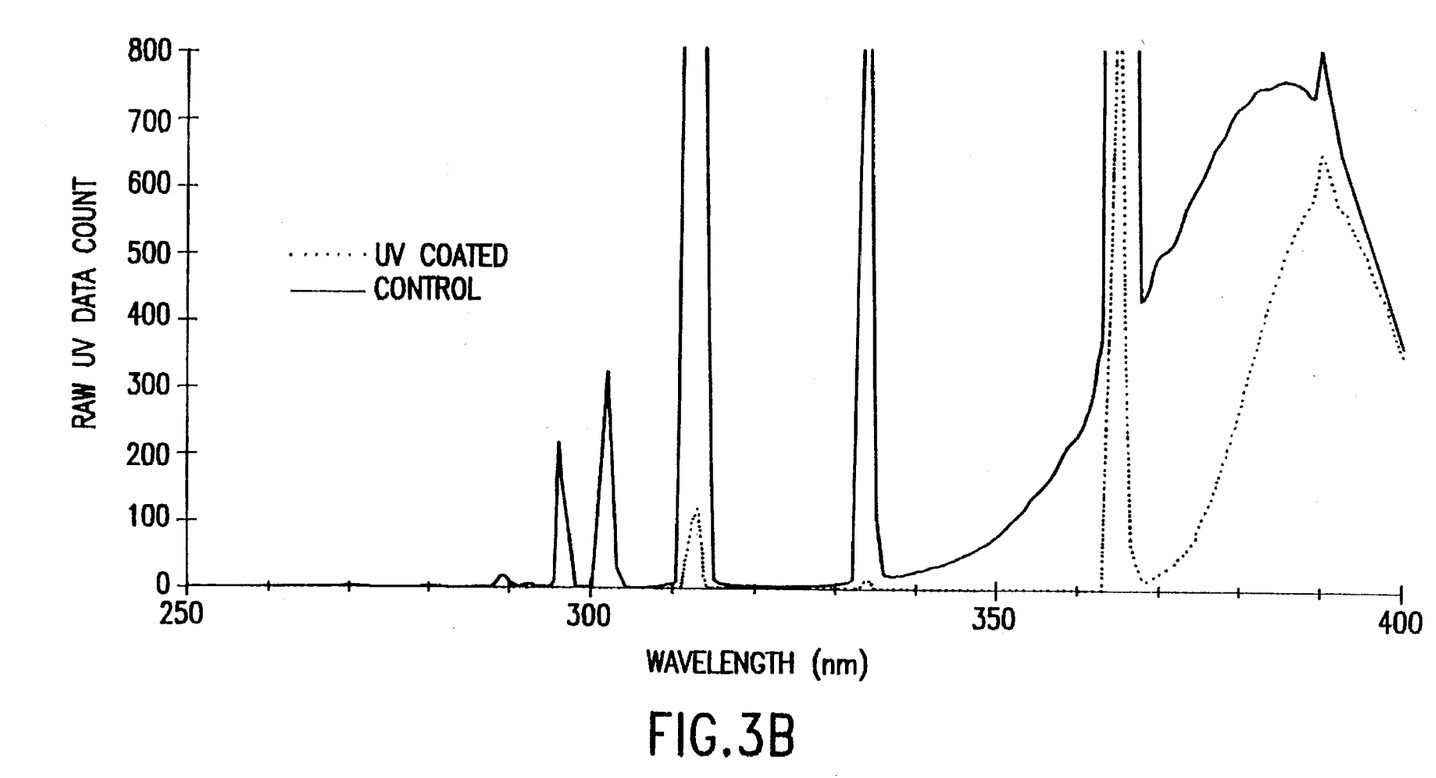

An F20T12/WW fluorescent light tube without a water repellant coating was provided with a UV-absorbing copolymer layer by brush coating the glass lamp tube with the aqueous latex of Example 8 (diluted with 2 volumes of water per volume of latex); excess liquid was brushed off and the thin wet coating was dried by rotating the glass tube under five 250 watt heat lamps providing a coating of about 1 micrometer thick. The UV-absorbing copolymer-coated lamp and 2 uncoated lamps (controls) were monitored for radiation emission in the range of 250–370 nanometers. The light flux from the lamps was integrated over the range of 250–370 nanometers of the UV part of the electromagnetic spectrum; the integrated radiation flux is reported in normalized light flux units (lfu). The reduction in light flux over the 100 hour test for the controls indicates normal variability in lamp output with time. The results reported in Table 3 show the utility of thin coatings of this invention in reducing the amount of UV radiation from a fluorescent light source; FIGS. 3A and 3B illustrate the reduction in the component parts of the UV spectrum effected by a 1 micrometer thick coating of the UV-absorbing copolymer measured after 100 hours of operation.

TABLE 3

| | Integrated Radiation Flux (250–370 nm) | |
|---|---|---|
| Lamp | Start | After 100 hours |
| Control 1 | 72.8 lfu | 72.4 lfu |
| Control 2 | 75.0 | 68.9 |
| UV-Coated | 2.7 | 2.3 |

EXAMPLE 29

The procedure of Example 9 was essentially repeated to provide an aqueous latex comprising 57.2 percent by weight dispersed polymeric compound comprising about 98 parts by weight of a copolymer of the monomer units UV-I:BA:2-EHA (26:16.5:4.7) and about 2 parts by weight of Plasticizer. The latex exhibited a surface tension of 45.2 dynes/cm$^2$.

EXAMPLE 30

Coatings were prepared by adding 5 ml of the aqueous latex of Example 29 to volumes of water and the wetting agents indicated in Table 4 to reduce the surface tension of the latex to facilitate coatings of lower surface tension substrates.

TABLE 4

| | Water, ml | Wetting Agent, ml | Surface Tension |
|---|---|---|---|
| a. | 7.5 | none | 44.4 dynes/cm$^2$ |
| b. | 7.5 | 0.06 Surfactant II | 40.8 |
| c. | 15 | none | 43.1 |
| d. | 15 | 0.2 isopropanol | 42.8 |
| e. | 15 | 0.2 isobutanol | 41.2 |
| f. | 15 | 0.2 n-butanol | 40.2 |

Latex a. was coated and dried at 61° C. on PET (surface tension about 43 dynes/cm$^2$) producing a hazy and uneven film; latex b. provided a clear smooth film on PET. Latices c. and d. provided uneven coatings on vinyl flooring tiles; latices e. and f. provided even coatings on vinyl flooring tiles.

EXAMPLE 31

Polyacrylic acid thickening agents were added to the 5 ml quantities of the aqueous latex of Example 29 diluted with 15 ml water to provide the latex indicated in Table 5, where the amount of thickener is indicated in weight percent of the latex. Viscosity was determined using a No. 1 Spindle on a Brookfield viscometer at 25° C. and the indicated RPM.

TABLE 5

| | Thickener | Viscosity |
|---|---|---|
| a. | PAA-XL, 0.4% | 9.2 cp (6 RPM) |
| b. | PAA-XL, 0.56% | 32.8 cp (6 RPM) |
| c. | PAA-XL, 0.7% | 117 cp (5 RPM) |
| d. | PAA, 0.6% | 400 cp (1.5 RPM) |

Latices a. and b. provided defective coatings on vinyl flooring tiles; latices c. and d. provided smooth coatings on vinyl flooring tiles.

EXAMPLE 32

The procedure of Example 29 was repeated substituting MMA for the 2EHA and omitting the Plasticizer to provide an aqueous latex (35% solid polymer having a Tg of 41° C.) which provided hazy films. Various coalescing agents were added to improve film clarity. A hazy film was provided with 1% ethylene glycol monobutyl ether, commercially known as butyl cellusove (BC) in the latex; a semi-hazy film at 50° C. with 2% BC; a clear film at 50° C. with 3 and 4% BC; a clear film at 25° C. with 5 and 6% BC; a semi-clear film at 50° C. with 1% dipropylene glycol methyl ether (DPGME); a clear film at 50° C. with 2% DPGME; a clear film at 25° C. with 10% DPGME; a clear film at 50° C. with 3% tripropylene glycol methyl ether (TPGME); and a clear film at 25° C. with 5% TPGME.

EXAMPLE 33

This example illustrates the preparation of UV-absorbing polymer films containing radical stabilizers and anti-oxidants. Separate 15 ml volumes of aqueous latex prepared according to the procedure of Example 29 but comprising 12.5% UV-absorbing polymer, 1% n-butanol wetting agent and 0.4 % PAA thickening agent were mixed in a 30 ml vial with one of the following radical stabilizers or anti-oxidants:

(a) 0.12 ml of 20% latex of Sanduvor 3051 HALS, (b) 0.15 ml of 25% Tinuvin 123 in NMP, (c) 0.15 ml of 25% Tinuving 292 HALS in NMP, (d) 0.22 ml of 2.5% Irganox 1010 anti-oxidant in NMP, and (e) 0.22 ml of Irganox 245 anti-oxidant in NMP.

Thin films of each mixture were drawn with a 25 micrometer doctor blade were dried in air, providing clear, stabilized films of UV-absorbing polymer.

EXAMPLE 34

This example illustrates the preparation of crosslinked films of UV-absorbing polymer of this invention. Using the procedure of Example 9, an aqueous latex of 24% solids UV-absorbing copolymer was prepared containing the monomer units UV-I:BA: MMA:AA;CEA (26:16:4:1:1). Separate volumes of the latex were mixed with each of the following crosslinking agents:

(a) none, designated as "Control", (b) 0.6% ammonium zirconylcarbonate, (c) 0.8% calcium acetate, (d) 1.6% Beetle 60, (e) 1.2% Beetle 65, (f) 0.5% Resimene 717, (g) 1.5% Resimene 745, and (h) 0.5% Resimene 7550.

Ammonium chloride (0.03%) was added as catalyst to urea formaldehyde crosslinker-containing latices; and p-toluene sulfonic acid (0.04%) was added to the melamine formaldehyde-containing latices. Each of the latices was coated onto a glass slide using spin coating technique, the wet films were dried in a 60° C. oven for three minutes. The hardness of the films reported in Table 6 was determined by pencil test using the procedure of ASTM D 3363-74 after 3 days and again after 5 days. The hardness scale runs from 6B (softest), through 5B, 4B, 3B, 2B, B, HB, F, H, 2H, 3H, 4H and 5H to 6H (hardest).

TABLE 6

| | Hardness | |
|---|---|---|
| Crosslinker | 3 days | 5 days |
| Control | 3B | F |
| ammonium zirconylcarbonate | HB | 4H |
| calcium acetate | 4B | HB |
| Beetle 60 | 2B | 6H |
| Beetle 65 | HB | 4H |
| Resimene 717 | B | 6H |
| Resimene 745 | HB | 5H |
| Resimene 7550 | B | 5H |

EXAMPLE 35

This example illustrates the preparation of a film of UV-absorbing copolymer hardened using an alkyd resin. During preparation of a UV-absorbing copolymer according to Example 34, 5% of an alkyd resin, designated as UN 1866 from Cargill, was added during the let-down stage of the emulsion polymerization. The resulting mixed latex was coated onto a glass slide using spin coating technique, the wet film were dried in a 60° C. oven for three minutes. After 5 days the film exhibited a pencil test hardness of HB.

EXAMPLE 36

This example illustrates the preparation of a film of a self-crosslinking UV-absorbing copolymer. A UV-absorbing copolymer was prepared according to the procedure of Example 34 with the addition of 1.4 parts of glycidyl methacrylate monomer units. The latex was coated onto a glass slide using spin coating technique, the wet film were dried in a 60° C. oven for three minutes. After 5 days the film exhibited a pencil test hardness of HB.

While specific embodiments have been described herein, it should be apparent to those skilled in the art that various modifications thereof can be made without departing from the true spirit and scope of the invention. Accordingly, it is intended that the following claims cover all such modifications within the full inventive concept.

What is claimed is:

1. An aqueous latex comprising colloidal particles of a UV-absorbing polymer dispersed in a substantially aqueous medium, wherein said particles are less than 5 micrometers in diameter, and wherein said polymer is selected from the group consisting of:
   (i) homopolymers of vinyl-functionalized monomer of benzotriazole or benzophenone,
   (ii) copolymers of vinyl-functionalized monomer of benzotriazole or benzophenone and at least one other vinyl monomer,
   (iii) mixtures of said homopolymers or copolymers, and plasticizer therefor,
   (iv) mixtures of said homopolymers or copolymers, and coalescing agent therefor, and
   (v) mixtures of said homopolymers or copolymers, and plasticizer and coalescing agent therefor; wherein said coalescing agent comprises a volatile solvent for said polymer added in an amount to swell the polymer and thereby reduce the glass transition temperature of the polymer in the latex to less than 50° C.; and wherein said latex contains a cross linking agent added to the latex after formation of the polymer and one or more of the following additives:
   (a) a wetting agent in an amount sufficient to provide said latex with a surface tension of less than 45 dynes/cm$^2$, wherein said wetting agent is selected from the group consisting of (i) volatile $C_2$ to $C_6$ alkyl alcohols, and (ii) non-volatile nonionic and anionic surfactant;
   (b) a thickening agent in an amount sufficient to provide the latex with a viscosity greater than 40 centipoises when measured at 25° C. with a Brookfield No. 1 spindle at 5 rpm;
   (c) an anti-oxidant; and
   (d) radical scavenger; such that the latex forms, upon curing, visible light transparent, crosslinked, coherent polymeric films.

2. A latex according to claim 1 wherein said dispersed particles have a diameter less than 1 micrometer.

3. A latex according to claim 2 wherein said dispersed particles have a diameter between 0.05 and 0.5 micrometers.

4. A latex according to claim 1 wherein said wetting agent is i) n-propanol or n-butanol, ii) the non-volatile surfactant is alkaryl polyether alcohol and the anionic surfactant is alkaryl polyether sulfonate and wherein said wetting agent is in an amount sufficient to provide said latex with a surface tension of less than 43 dynes/cm$^2$.

5. A latex according to claim 4 wherein said wetting agent is in an amount sufficient to provide said latex with a surface tension of less than 41 dynes/cm$^2$.

6. A latex according to claim 1 comprising less than 1 percent by weight of a thickening agent selected from the group consisting of polyacrylic acid and salts thereof, a methylcellulose and water soluble polyurethane and wherein said thickening agent is in an amount sufficient to provide said latex with a viscosity greater than 100 centipoises when measured at 25° C.

7. A latex according to claim 6 wherein said thickening agent is in an amount sufficient to provide a viscosity greater than 200 centipoises when measured at 25° C.

8. A latex according to claim 7 wherein said thickening agent is in an amount sufficient to provide a viscosity greater than 300 centipoises when measured at 25° C.

9. A latex according to claim 1 comprising up to 20 percent by weight of a coalescing agent selected from the group consisting of diethylene glycol monoethyl ether, dipropylene glycol monomethyl ether, tripropylene glycol monomethyl ether, diethylenene glycol monobutyl ether, ethylene glycol monobutyl ether, propylene glycol monobutyl ether and N-methyl-2-pyrrolidone; and wherein the polymer in said emulsion has a glass transition temperature less than 30° C.

10. A latex according to claim 1 wherein said plasticizer is selected from the group consisting of alkyl adipate esters, aryl adipate esters, alkyl aryl adipate esters, alkyl benzoate esters, aryl benzoate esters, alkyl aryl benzoate esters, alkyl phthalate esters, aryl phthalate esters, alkyl aryl phthalate esters, alkyl citrate esters, alkyl phosphate esters, aryl phosphate esters, alkyl aryl phosphate esters.

11. A latex according to claim 1 wherein said crosslinking agent is selected from the group consisting of ammonium zirconylcarbonate, calcium acetate, zinc oxide, unsaturated fatty acids, polyepoxy or polyvinyl compounds or mixtures thereof, methylated urea-formaldehyde resin, methylated melamine-formaldehyde resin and alkyd resins.

12. A latex according to claim 1 wherein said copolymer comprises between 40 and 80 weight percent of an acrylate or methacrylate-functionalized monomer of benzotriazole or benzophenone.

13. A latex according to claim 12 wherein said other vinyl monomer is an acrylate monomer selected from methylmethacrylate, ethyl acrylate, ethyl methacrylate, butyl acrylate, butyl methacrylate, 2-ethylhexyl acrylate, 2-ethylhexyl methacrylate, acrylic acid, methacrylic acid, hydroxyethyl acrylate, hydroxyethyl methacrylate, hydroxypropyl acrylate, hydroxypropyl methacrylate, decylmethacrylate, styrene, vinyl acetate and glycidyl methacrylate.

14. A latex according to claim 13 wherein said copolymer, when essentially devoid of coalescing agent, has a glass transition temperature in the range of −50° C. to 150° C.

15. A latex according to claim 1 comprising sufficient wetting, thickening and coalescing agents to provide non-sagging wet films of said latex on a vertical sheet comprising polycarbonate, polyethylene terephthalate, polyvinylchloride, polystyrene, polymethylmethacrylate or ABS, that dry to coherent films of said polymer in a thickness less than 5 micrometers.

16. A laminate comprising a UV-sensitive substrate coated with an adherent, coherent, crosslinked, UV-resistant vinyl polymeric film comprising:
   (i) 20 to 100 percent by weight UV-absorbing monomer units of vinyl-functionalized benzotriazole or vinyl-functionalized benzophenone and 0–80 weight percent of at least one other vinyl monomer,
   (ii) a crosslinked network-forming resin, and
   (iii) one or more additives selected from the group consisting of plasticizer, nonionic surfactant wetting agent, anionic surfactant wetting agent and thickening agent.

17. A laminate of claim 16 having an adhesive layer on the opposite side of said substrate from said UV-resistant vinyl polymeric film.

18. A laminate of claim 16 having an adhesive layer on said UV-resistant vinyl polymeric film.

19. A laminate according to claim 16 wherein said UV-resistant vinyl polymeric film is adhesive.

20. A laminate according to claim 16 wherein said UV-sensitive substrate is transparent.

21. A laminate according to claim 16 wherein said substrate is a polymeric textile or molded article.

22. A UV-blocking light-transmitting substrate comprising a crystalline, glass or plastic windowpane, container or film wherein said substrate is coated with an adherent, coherent, crosslinked UV-resistant vinyl polymeric film comprising:
   (i) 20 to 100 percent by weight UV-absorbing monomer units of vinyl-functionalized benzotriazole or vinyl-functionalized benzophenone and 0–80 weight percent of at least one other vinyl monomer,
   (ii) a crosslinked network-forming resin, and
   (iii) one or more additives selected from the group consisting of plasticizer, nonionic surfactant wetting agent, anionic surfactant wetting agent and thickening agent.

23. An ink, cosmetic or polymer resin formulation comprising dispersed latex of UV-resistant, crosslinkable vinyl polymer comprising:
   (i) 20 to 100 percent by weight UV-absorbing monomer units of vinyl-functionalized benzotriazole or vinyl-functionalized benzophenone and 0–80 weight percent of at least one other vinyl monomer,
   (ii) network-forming resin and crosslinking agent for the resin, and
   (iii) one or more additives selected from the group consisting of plasticizer, nonionic surfactant wetting agent, anionic surfactant wetting agent and thickening agent.

24. The latex of claim 1 wherein the crosslinking agent is melamine formaldehyde resin.

25. The latex of claim 1 wherein the crosslinking agent is ammonium zirconylcarbonate.

26. The latex of claim 24 wherein the crosslinking agent is in solution in n-butyl alcohol.

27. The latex of claim 26 wherein the solution includes a catalyst.

\* \* \* \* \*